(12) United States Patent
Elshafie et al.

(10) Patent No.: US 12,095,593 B2
(45) Date of Patent: Sep. 17, 2024

(54) DEMODULATION REFERENCE SIGNAL (DMRS) FOR OVERLAPPED UPLINK (UL) AND DOWNLINK (DL) DMRS RESOURCES

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Ahmed Attia Abotabl, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/525,746

(22) Filed: Nov. 12, 2021

(65) Prior Publication Data

US 2023/0155865 A1  May 18, 2023

(51) Int. Cl.
*H04L 25/02* (2006.01)
*H04L 5/00* (2006.01)
*H04L 27/26* (2006.01)

(52) U.S. Cl.
CPC ........ *H04L 25/0224* (2013.01); *H04L 5/0007* (2013.01); *H04L 5/0048* (2013.01); *H04L 27/2607* (2013.01); *H04L 27/26524* (2021.01)

(58) Field of Classification Search
CPC ............. H04L 25/0224; H04L 25/0226; H04L 25/0228; H04L 25/023; H04L 25/0232;

(Continued)

(56) References Cited

U.S. PATENT DOCUMENTS

2018/0316534 A1* 11/2018 Shin .................... H04L 27/2602
2020/0092061 A1 3/2020 Wang et al.
2021/0143962 A1* 5/2021 Jiang .................... H04L 5/0051

FOREIGN PATENT DOCUMENTS

WO  2020237452 A1  12/2020

OTHER PUBLICATIONS

International Search Report and Written Opinion—PCT/US2022/048626—ISA/EPO—Mar. 3, 2023.

* cited by examiner

*Primary Examiner* — Ian N Moore
*Assistant Examiner* — Brian T Le
(74) *Attorney, Agent, or Firm* — Seyfarth Shaw LLP (57) ABSTRACT

A method of wireless communication by a user equipment (UE) includes receiving, from a base station, a downlink demodulation reference signal (DMRS) generated from a downlink DMRS configuration. The method also includes transmitting, to the base station, an uplink DMRS generated from an uplink DMRS configuration. A value of one or more parameter(s) of the uplink DMRS configuration differs from a value of the parameter(s) of the downlink DMRS configuration. A method of wireless communication by a base station includes transmitting, to a user equipment (UE), a downlink demodulation reference signal (DMRS) generated from a downlink DMRS configuration. The method also includes receiving, from the UE, an uplink DMRS generated from an uplink DMRS configuration. A value of one or more parameter(s) of the uplink DMRS configuration differs from a second value of the parameter(s) of the downlink DMRS configuration.

24 Claims, 7 Drawing Sheets

(58) Field of Classification Search
CPC ............. H04L 25/0234; H04L 25/0236; H04L 5/0007; H04L 5/0048; H04L 27/26524; H04L 27/26526; H04L 27/2607
See application file for complete search history.

DEMODULATION REFERENCE SIGNAL (DMRS) FOR OVERLAPPED UPLINK (UL) AND DOWNLINK (DL) DMRS RESOURCES

FIELD OF THE DISCLOSURE

The present disclosure relates generally to wireless communications, and more specifically to considerations for demodulation reference signals (DMRSs) with partially or fully overlapped uplink (UL) and downlink (DL) DMRS resources.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a user equipment (UE) includes receiving, from a base station, a downlink demodulation reference signal (DMRS) generated from a downlink DMRS configuration. The method also includes transmitting, to the base station, an uplink DMRS generated from an uplink DMRS configuration. A first value of one or more parameter(s) of the uplink DMRS configuration differs from a second value of the parameter(s) of the downlink DMRS configuration.

In other aspects of the present disclosure, a method of wireless communication by a base station includes transmitting, to a user equipment (UE), a downlink demodulation reference signal (DMRS) generated from a downlink DMRS configuration. The method also includes receiving, from the UE, an uplink DMRS generated from an uplink DMRS configuration. A first value of one or more parameter(s) of the uplink DMRS configuration differs from a second value of the parameter(s) of the downlink DMRS configuration.

Other aspects of the present disclosure are directed to an apparatus for wireless communication by a user equipment (UE) having a memory and one or more processor(s) coupled to the memory. The processor(s) is configured to receive, from a base station, a downlink demodulation reference signal (DMRS) generated from a downlink DMRS configuration. The processor(s) is also configured to transmit, to the base station, an uplink DMRS generated from an uplink DMRS configuration. A first value of at least one parameter of the uplink DMRS configuration differs from a second value of the at least one parameter of the downlink DMRS configuration.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Next generation wireless networks (such as fifth generation (5G) networks) are expected to provide ultra high data rates and to support a wide scope of application scenarios. Wireless full duplex (FD) communication is an emerging technique and is theoretically capable of doubling the link capacity. Wireless full duplex communication may enable radio network nodes to transmit and receive simultaneously on the same frequency band during the same time slot. In conventional half duplex operation, transmission and reception either differ in time or in frequency.

A full duplex network node, such as a base station in the cellular network, can communicate simultaneously in the uplink (UL) and the downlink (DL) with two half duplex terminals using the same radio resources. Another wireless full duplex application scenario includes a relay node that can communicate simultaneously with an anchor node and the mobile terminal in a one-hop scenario, or with two other relay nodes in a multi-hop scenario. A full duplex capable user equipment (UE) may also be provided. A full duplex capable UE is capable of simultaneous transmission and reception using the same time-frequency radio resources. By doubling capacity of each link, full duplexing may significantly increase the system throughput in diverse applications in a wireless communication network.

In the 5G new radio (NR) standards, a demodulation reference signal (DMRS) is used to estimate a real-time channel of a physical downlink shared channel (PDSCH) and a physical uplink shared channel (PUSCH). When a UE operates in full duplex mode, and the uplink and downlink DMRS resources overlap, there should be some consideration of the DMRS configuration, such as scrambling IDs and orthogonal cover codes (OCCs), to improve the quality of channel estimation under self-interference.

According to aspects of the present disclosure, a base station may configure uplink DMRS parameters and downlink DMRS parameters to be different from one another when the DMRS uplink and downlink resources overlap (partially or fully) in frequency and/or time. For example, a scrambling identifier (ID) of an uplink DMRS may be configured to be different than a scrambling ID for a downlink DMRS when the DMRS tones overlap. In other aspects, the base station should assign different orthogonal cover codes (OCCs) to the uplink DMRS and the downlink DMRS so that they do not share the same time/frequency orthogonal cover codes.

According to further aspects of the present disclosure, when uplink and downlink DMRS resources overlap (partially or fully in the time/frequency domain), the UE derives the uplink DMRS configuration directly from the downlink DMRS configuration. For example, the UE and/or base station may determine uplink DMRS scrambling IDs given a downlink DMRS scrambling ID. In these aspects, the uplink DMRS scrambling ID is implicitly obtained from the downlink DMRS scrambling ID. In still other aspects of the present disclosure, the criterion used for determining a best scrambling ID given another scrambling ID is dependent on waveform.

Figure 1:
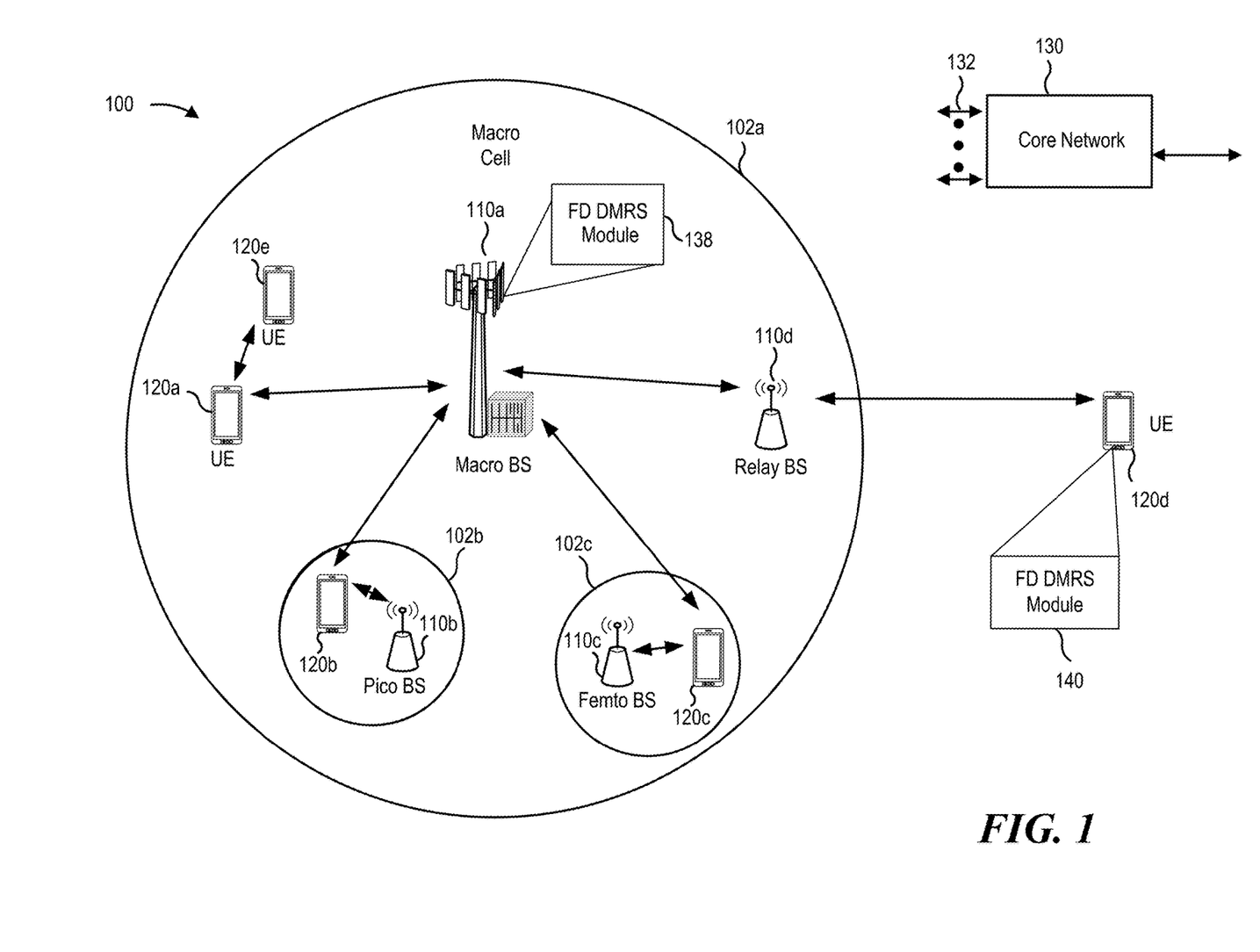
FIG. 1 is a block diagram conceptually illustrating an example of a wireless communications network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a full duplex (FD) demodulation reference signal (DMRS) module 140. For brevity, only one UE 120d is shown as including the FD DMRS module 140. The FD DMRS module 140 may receive, from a base station, a downlink demodulation reference signal (DMRS) generated from a downlink DMRS configuration. The FD DMRS module 140 may transmit, to the base station, an uplink DMRS generated from an uplink DMRS configuration. A value of one or more parameter(s) of the uplink DMRS configuration differing from a value of the parameter(s) of the downlink DMRS configuration.

The core network 130 or the base stations 110 may include an FD DMRS module 138. For brevity, on one base station 110 is shown as including the FD DMRS module 138. The FD DMRS module 138 may transmit, to a user equipment (UE), a downlink demodulation reference signal (DMRS) generated from a downlink DMRS configuration. The FD DMRS module 138 may also receive, from the UE, an uplink DMRS generated from an uplink DMRS configuration. A value of one or more parameter(s) of the uplink DMRS configuration differing from a value of the parameter(s) of the downlink DMRS configuration.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
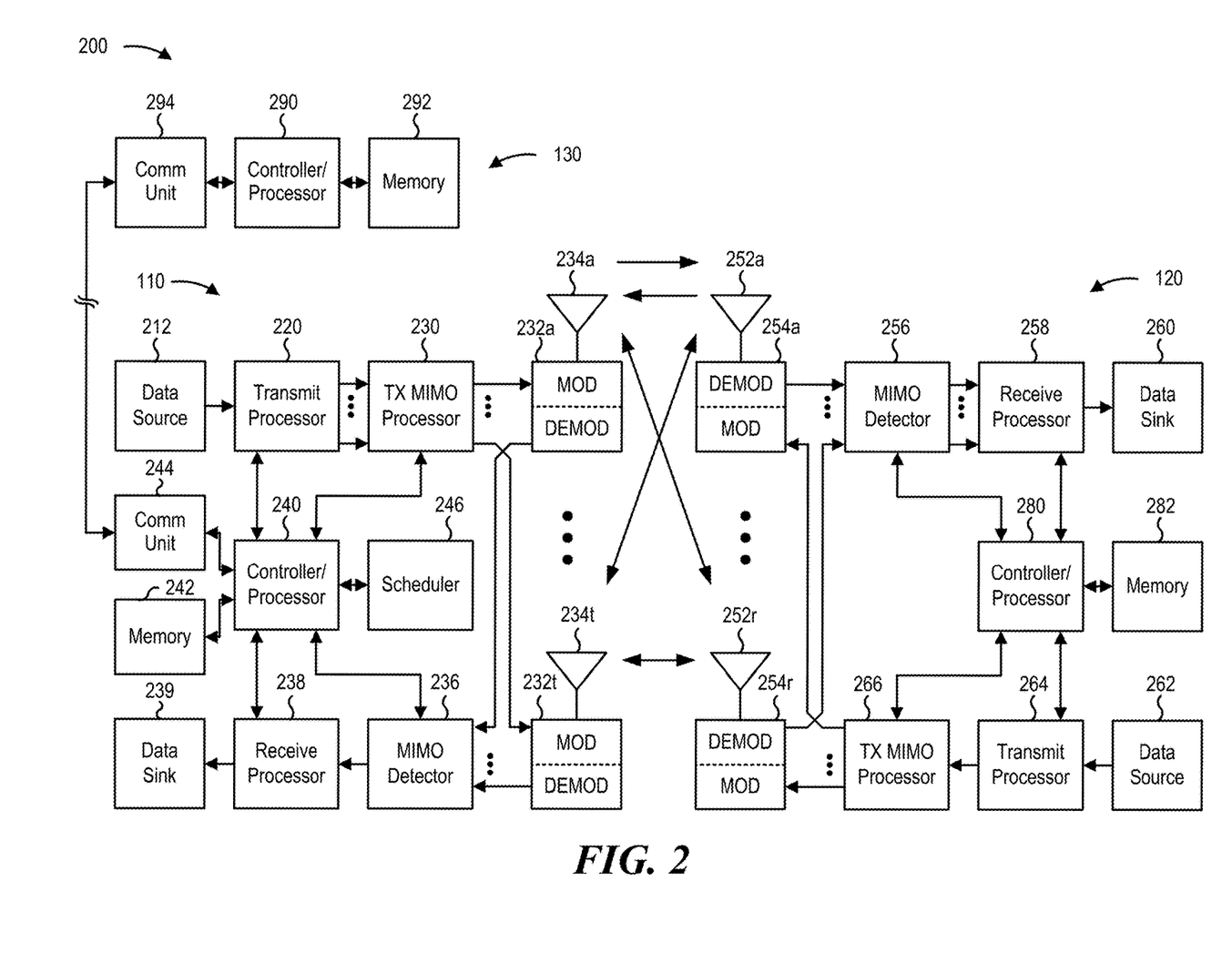
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with DMRS configuration for overlapping DMRS resources, as described in more detail elsewhere. For example, the controller/processor 240 of the base station 110, the controller/processor 280 of the UE 120, and/or any other component(s) of FIG. 2 may perform or direct operations of, for example, the processes of FIGS. 7 and 8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 or base station 110 may include means for receiving, means for transmitting, means for determining, and/or means for indicating. Such means may include one or more components of the UE 120 or base station 110 described in connection with FIG. 2.

As indicated above, FIG. 2 is provided merely as an example. Other examples may differ from what is described with regard to FIG. 2.

Next generation wireless networks (such as fifth generation (5G) networks) are expected to provide ultra high data rates and to support a wide scope of application scenarios. Wireless full duplex (FD) communication is an emerging technique and is theoretically capable of doubling the link capacity. Wireless full duplex communication may enable radio network nodes to transmit and receive simultaneously on the same frequency band during the same time slot. In conventional half duplex operation, transmission and reception either differ in time or in frequency.

A full duplex network node, such as a base station in the cellular network, can communicate simultaneously in the uplink (UL) and the downlink (DL) with two half duplex terminals using the same radio resources. Another wireless full duplex application scenario includes a relay node that can communicate simultaneously with an anchor node and the mobile terminal in a one-hop scenario, or with two other relay nodes in a multi-hop scenario. By doubling capacity of each link, full duplexing may significantly increase the system throughput in diverse applications in wireless communication networks. Full duplexing may also reduce the transfer latency for time critical services.

In order to enable full duplex transmissions, the capability of cancelling strong self-interference between the downlink and the uplink should be present. Current full duplex radio designs can suppress up to 110 dB of self-interference by combining the technologies of beamforming, analog cancellation, digital cancellation, and antenna cancellation. UE-to-UE interference may also be an issue. Because the downlink UE and uplink UE (or backhaul link and access link) employ the same time-frequency resources, if these two UEs (or two nodes) are near one another, the uplink transmission signal may cause co-channel interference to the downlink signal reception.

Figure 3:
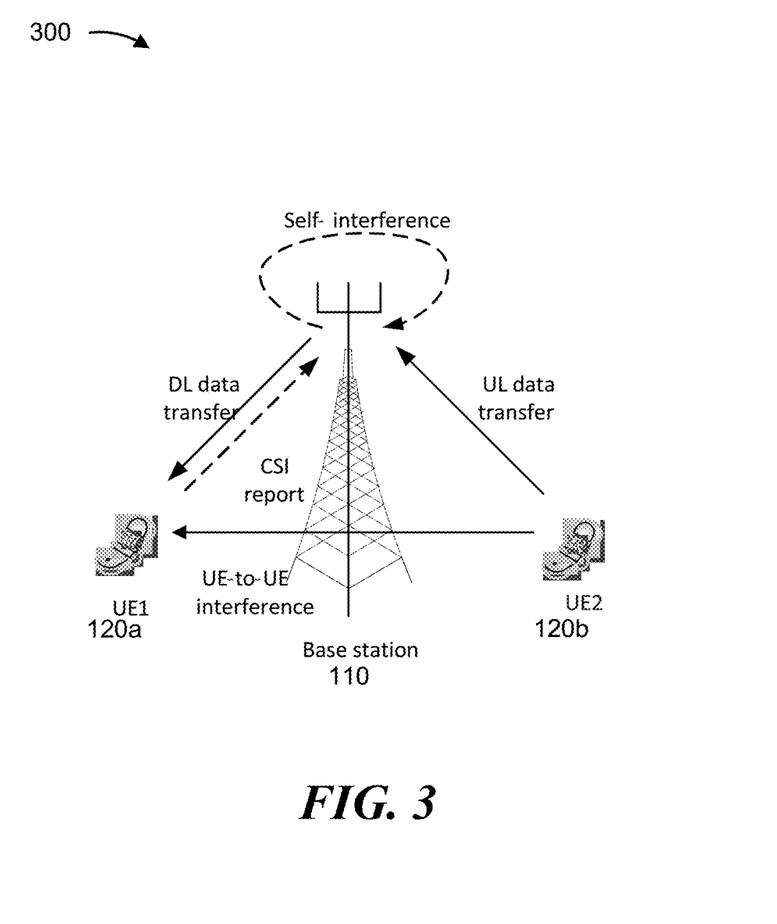
FIG. 3 is a diagram illustrating a cellular system with a full duplex base station, in accordance with aspects of the present disclosure.

FIG. 3 is a diagram illustrating a cellular system 300 with a full duplex base station, in accordance with aspects of the present disclosure. In the example of FIG. 3, a full duplex network node, such as a base station 110 in the cellular system 300, communicates simultaneously in the uplink and the downlink with two non-full duplex terminals (UE1 120a and UE2 120b) using the same radio resources. With full duplex communications, the downlink of a first UE (UE1 120a) and the uplink of the second UE (UE2 120b) can coexist at the same radio spectrum simultaneously in a cell. In the uplink, the second UE (UE2 120b) transmits a signal to the base station 110. In the downlink, the first UE (UE1 120a) receives a signal from the base station 110. In full duplex mode, the UE (UE2 120b) that transmits the signal in the uplink generates inter-UE interference to the UE (UE1 120b) that receives the signal in the downlink. On the other hand, the transmitted signal in the downlink generates self-interference to the received signal in the uplink at the base station 110.

Figure 4:
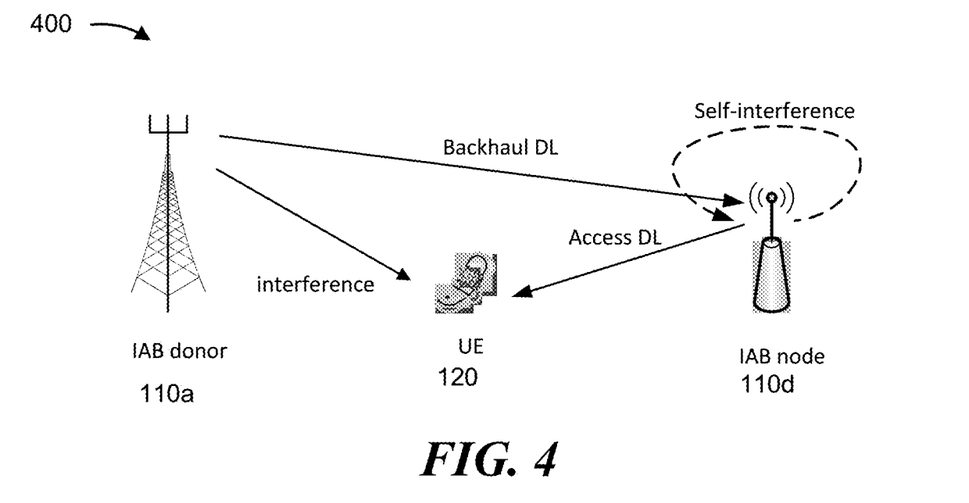
FIG. 4 is a diagram illustrating a cellular system with a full duplex integrated access and backhaul (IAB) node that is processing downlink traffic, in accordance with aspects of the present disclosure.
Figure 5:
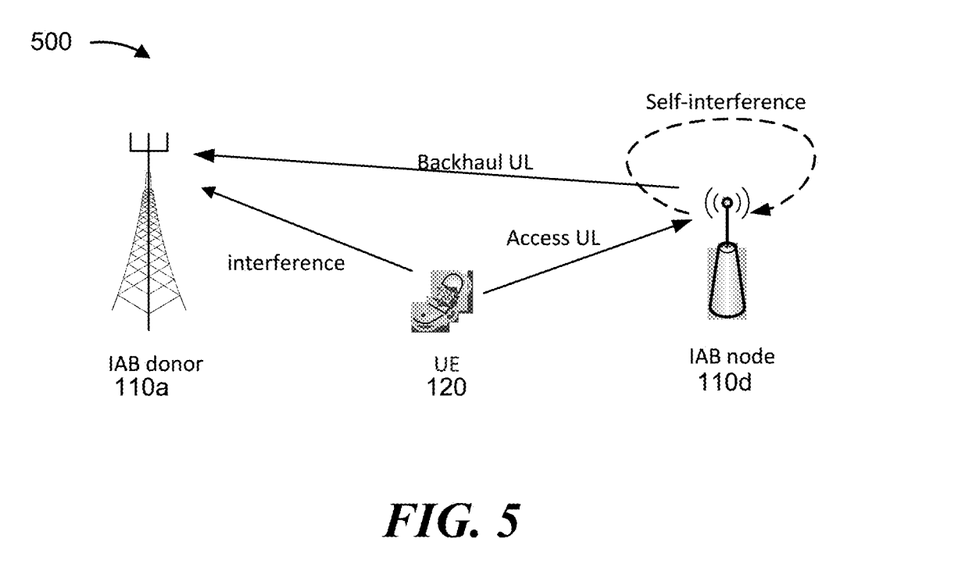
FIG. 5 is a diagram illustrating a cellular system with a full duplex IAB node that is processing uplink traffic, in accordance with aspects of the present disclosure.

FIG. 4 is a diagram illustrating a cellular system 400 with a full duplex integrated access and backhaul (IAB) node that is processing downlink traffic, in accordance with aspects of the present disclosure. FIG. 5 is a diagram illustrating a cellular system 500 with a full duplex JAB node that is processing uplink traffic, in accordance with aspects of the present disclosure. In the example of FIG. 4, an IAB node 110d may be regarded as a relay node through which the data can be transmitted from an JAB donor 110a to a UE 120. In the example of FIG. 5, the IAB node 110d may be regarded as a relay node through which the data can be transmitted from the UE 120 to the IAB donor 110a. With full duplex communications, the IAB node 110d can receive the data from the IAB donor 110a and transmit the data to the UE 120 (as shown in FIG. 4), or the IAB node 110d can receive the data from the UE 120 and transmit the data to the IAB donor 110a (as shown in FIG. 5) using the same time-frequency radio resources. Similar to a Uu interface (e.g., direct communication between a base station and UE), at the IAB node 110d, the interference from the backhaul link to the access link (from the IAB donor 110a to the UE 120 in FIG. 4) or the interference from the access link to the backhaul link (from the UE 120 to the IAB donor 110a in FIG. 5) causes data reception performance deterioration.

A full duplex capable UE may also be provided. A full duplex capable UE is capable of simultaneous transmission and reception using the same time-frequency radio resources. In the scenarios described with respect to FIGS. 3-5, the network throughput is increased, but the UE throughput remains the same. With a full duplex capable UE, the UE aggregated downlink and uplink throughput can be increased. This is suitable when both DL and UL traffic are heavy for a single user.

Figure 6:
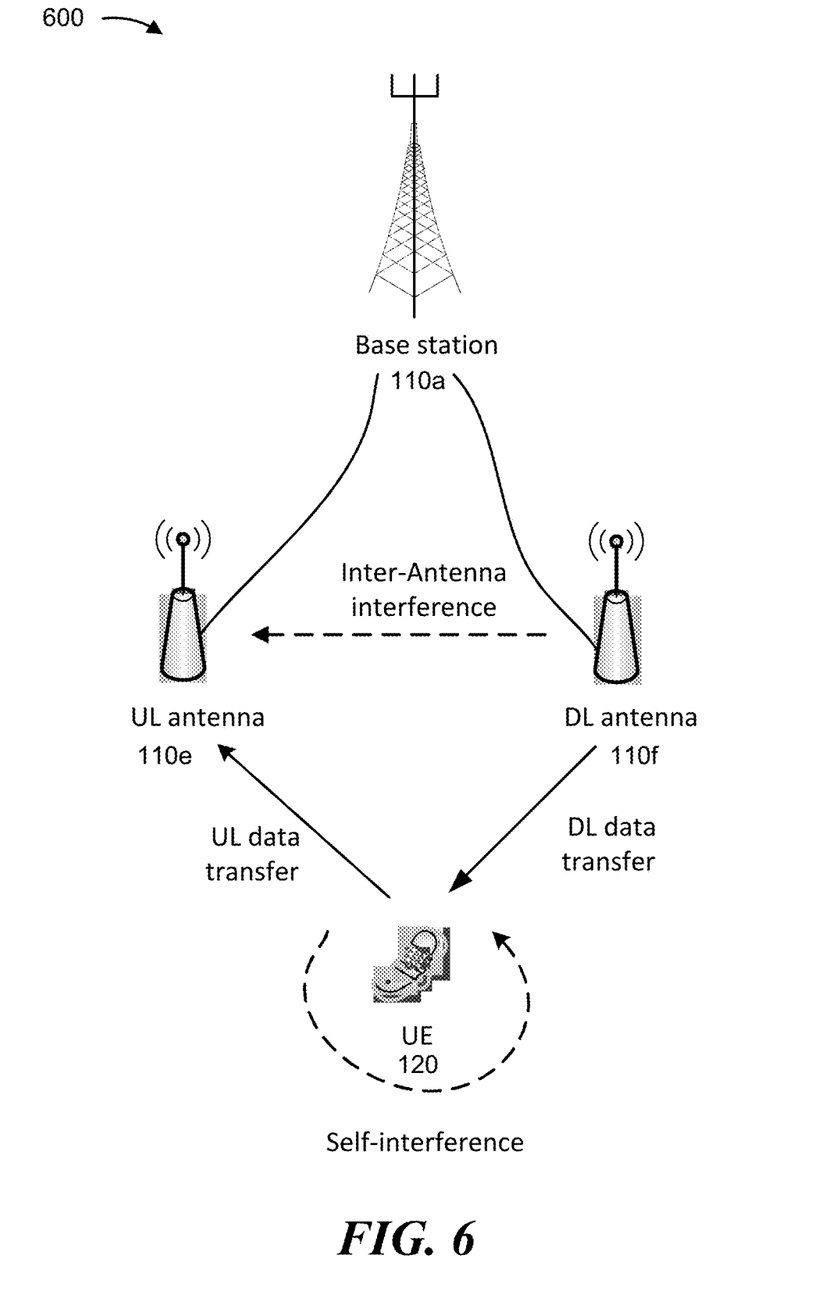
FIG. 6 is a diagram illustrating a cellular system with a full duplex user equipment (UE), in accordance with aspects of the present disclosure.

FIG. 6 is a diagram illustrating a cellular system 600 with a full duplex user equipment (UE), in accordance with aspects of the present disclosure. In the example of FIG. 6, a base station 110a communicates with a full duplex capable UE 120. The base station 110a has a set of uplink antenna(s) 110e and a set of downlink antenna(s) 110f. These two antenna sets 110e, 110f can be placed remotely to reduce their inter-antenna interference. In other configurations, the two antenna sets 110e, 110f are located close to each other or even integrated as one antenna set if the inter-antenna interference can be sufficiently mitigated. The UE 120 is capable of transmitting a signal and receiving a signal on the same time-frequency radio resources. The self-interference caused by the transmitted signal to the received signal can be mitigated so that both the downlink data transfer and uplink data transfer are effective.

In the 5G new radio (NR) standards, a demodulation reference signal (DMRS) is used to estimate a real-time channel of a physical downlink shared channel (PDSCH) and physical uplink shared channel (PUSCH). A number of ports for the DMRS is the sum of the number of all data ports from one UE or multiple UEs. The DMRS have two kinds of time-domain locations: front-loaded DMRS and additional DMRSs. For the former, the DMRS symbols may be located at the beginning of the PDSCH/PUSCH. For the latter, the DMRS symbols may be located at the middle of the PDSCH/PUSCH.

The DMRS has two timing mapping types: type A or type B. Type-A DMRS starts from orthogonal frequency division multiplexing (OFDM) symbol two or three. Type-B DMRS starts from OFDM symbols zero to twelve. For both types, the possible number of additional DMRS symbols is zero, one, two, or three.

The DMRS has two frequency configuration types: type 1 or type 2. For the former, there are at most two code division multiplexing (CDM) groups in one physical resource block (PRB), each taking up six subcarriers. For the former, there are at most three code division multiplexing groups in one physical resource block, each taking up four subcarriers. One code division multiplexing group can have at most two ports (when the number of front-loaded DMRS symbols is one) or four ports (when the number of front-loaded DMRS symbols is two). The PDSCH or PUSCH can have at most twelve ports.

The ports in each code division multiplexing group occupy two or four resource elements, in which the predefined sequence is weighted by the Hadamard matrix. By doing so, diversity gain can be obtained for each port. The number of code division multiplexing groups and the indexes of used antenna ports are indicated by radio resource control (RRC) messages for periodic/semi-persistent data transfer, or by downlink control information (DCI) messages for aperiodic data transfer.

For any UE, the timing mapping type, type A or type B, and the frequency configuration type, type 1 or type 2, of DMRS, the number of front-loaded DMRS symbols, and the maximum number of additional DMRS symbols are configured in the radio resource control layer. Then, the actual number and timing positions of the DMRS symbols depend on the start timing position and length of the PDSCH/PUSCH (e.g., the number of occupied OFDM symbols in the PDSCH/PUSCH). Because the time-domain resources for PDSCH/PUSCH can be scheduled dynamically on a per-slot basis in downlink control information (DCI), the actual DMRS symbols for PDSCH/PUSCH may dynamically vary.

When a UE operates in full duplex mode, and the uplink and downlink DMRS resources overlap, there should be some consideration of the DMRS configuration, such as scrambling IDs and orthogonal cover codes (OCCs), to improve the quality of channel estimation under self-interference.

According to aspects of the present disclosure, a base station may configure uplink DMRS parameters and downlink DMRS parameters to be different from one another when the DMRS uplink and downlink resources overlap (partially or fully) in frequency and/or time. For example, a scrambling ID of an uplink DMRS may be configured to be different than a scrambling ID for a downlink DMRS when the DMRS tones overlap.

In other aspects, the UE and/or base station may generate a table of best uplink DMRS scrambling IDs given a downlink DMRS scrambling ID. The table may be generated based on a transmission history or the UE implementation, for example. In other aspects, a function or procedure, such as a defined offset, may indicate how to obtain the uplink scrambling ID from the downlink scrambling ID. The UE may recommend a scrambling ID to the base station based on the table, function, or procedure. The UE and base station may then agree on the scrambling ID. In these aspects, the uplink DMRS scrambling ID is implicitly obtained from the downlink DMRS scrambling ID. In other aspects, an uplink DMRS OCC is determined based on a configuration of a downlink DMRS OCC.

In still other aspects of the present disclosure, the criterion used for determining a best scrambling ID given another scrambling ID and/or determining an uplink DMRS OCC from a configured downlink DMRS OCC is dependent on waveform. For example, if the UE and the base station both use a cyclic prefix orthogonal frequency division multiplexing (CP-OFDM) waveform, then the UE computes the correlation between the DMRS sequence generated from the uplink DMRS ID and the DMRS sequence generated from the downlink DMRS ID. The correlation may be used to determine a best pair of uplink and downlink DMRS IDs. The sequences with a lowest correlation may be selected. For example, a correlation between the sequences generated from a first DMRS ID and a second DMRS ID may be lower than a correlation between the sequences generated from a first DMRS ID and a third DMRS ID. Thus, the sequences generated from the first and second DMRS IDs will be selected as the best pair of uplink and downlink DMRS IDs.

If the UE uses a CP-OFDM waveform and the base station uses a single carrier orthogonal frequency division multiplexing (SC-OFDM) waveform, the UE computes the correlation between the DMRS sequence generated from the uplink DMRS ID and the discrete Fourier transform (DFT) of the DMRS sequence generated by the downlink DMRS ID. That is, the sequence is mapped to the frequency domain before calculating the correlation. The correlation between the uplink sequence and the DFT of the downlink sequence may be used to determine a best pair of uplink and downlink DMRS IDs.

If the UE uses an SC-OFDM waveform and the base station uses a CP-OFDM waveform, then the UE computes a correlation between the DFT of the DMRS sequence generated from the uplink DMRS ID and the DMRS sequence generated from the downlink DMRS ID. If the UE and the base station both use SC-OFDM waveforms, the UE computes the correlation of the DFT of the DMRS sequence generated from the uplink DMRS ID and the DFT of the DMRS sequence generated by the downlink DMRS ID. The correlations may be used to determine a best pair of uplink and downlink DMRS IDs.

In some aspects, the base station should assign different orthogonal cover codes (OCCs) to the uplink DMRS and the downlink DMRS so that they do not share the same time/frequency orthogonal cover codes. In these aspects, the frequency division orthogonal cover code is equivalent to the time domain cyclic shift (CS).

According to aspects of the present disclosure, when uplink and downlink DMRS resources overlap (partially or fully in the time/frequency domain), the UE derives the uplink DMRS configuration directly from the downlink DMRS configuration. That is, when the uplink and downlink DMRS resources overlap, a mode of operation may be introduced where the uplink DMRS configuration is directly inherited from the downlink DMRS configuration. The base station may configure the downlink DMRS configuration, and then the UE will use some of the same configuration parameters to transmit an uplink DMRS, for example, the same transmission comb level and same transmission comb offset to enable overlapping. In other aspects, some of these uplink DMRS parameters are different, for example, a shifted version of the transmission comb level may be used for the uplink DMRS. The shift may be expressed as the downlink comb level+X, where X is RRC or MAC-CE or DCI configured. In these aspects, the uplink DMRS scrambling ID and orthogonal cover code may be derived as described above, with the uplink DMRS scrambling ID and OCC differing from the downlink DMRS scrambling ID and OCC.

As indicated above, FIGS. 3-6 are provided as examples. Other examples may differ from what is described with respect to FIGS. 3-6.

Figure 7:
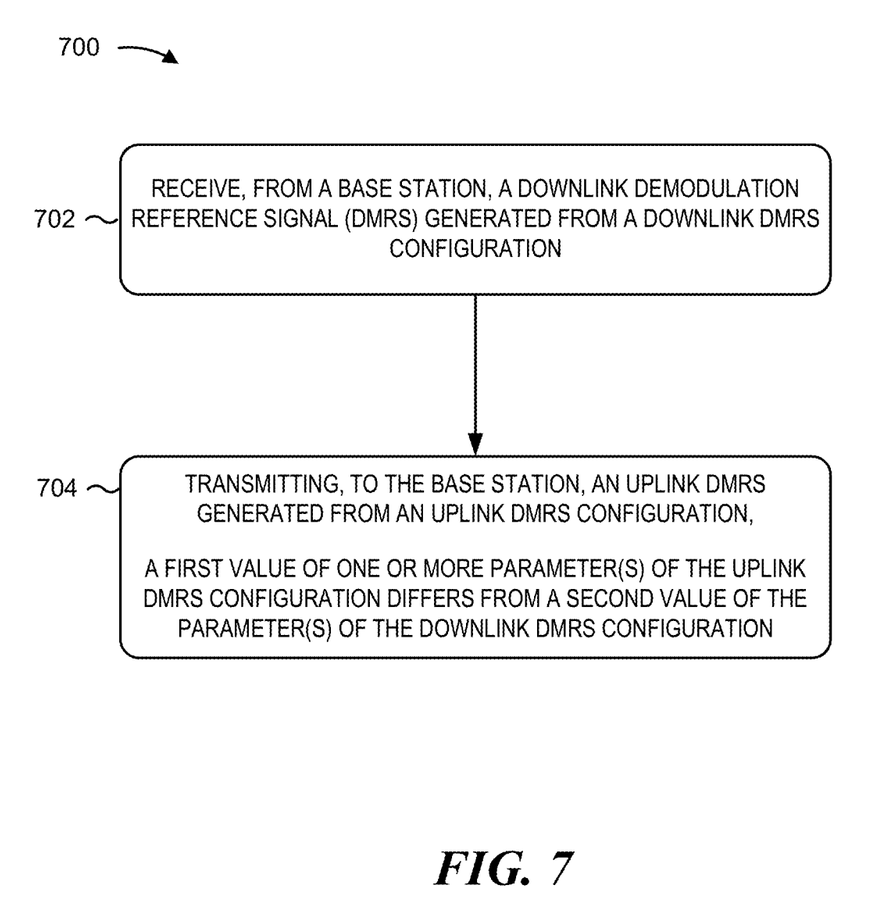
FIG. 7 is a flow diagram illustrating an example process performed, for example, by a user equipment (UE), in accordance with various aspects of the present disclosure.

FIG. 7 is a flow diagram illustrating an example process 700 performed, for example, by a user equipment (UE), in accordance with various aspects of the present disclosure. The example process 700 is an example of demodulation reference signals (DMRSs) with partially or fully overlapped uplink (UL) and downlink (DL) DMRS resources. The operations of the process 700 may be implemented by a UE 120.

At block 702, the user equipment (UE) receives, from a base station, a downlink demodulation reference signal (DMRS) generated from a downlink DMRS configuration. For example, the UE (e.g., using the antenna 252, DEMOD/MOD 254, MIMO detector 256, receive processor 258, controller/processor 280, and/or memory 282) may receive the DMRS. In some aspects, the UE may determine an uplink DMRS configuration based on the downlink DMRS configuration.

At block 704, the user equipment (UE) transmits, to the base station, an uplink DMRS generated from an uplink DMRS configuration. A first value of one or more parameter(s) of the uplink DMRS configuration differs from a second value of the parameter(s) of the downlink DMRS configuration. For example, the UE (e.g., using the antenna 252, DEMOD/MOD 254, TX MIMO processor 266, transmit processor 264, controller/processor 280, and/or memory 282) may transmit the uplink DMRS. The transmitting may occur in response to the downlink DMRS at least partially overlapping with the uplink DMRS. The one or more parameter(s) of the downlink DMRS configuration includes a downlink DMRS scrambling identifier (ID), a downlink DMRS orthogonal cover code (OCC), a downlink DMRS transmission comb level, and/or a downlink DMRS transmission comb offset.

Figure 8:
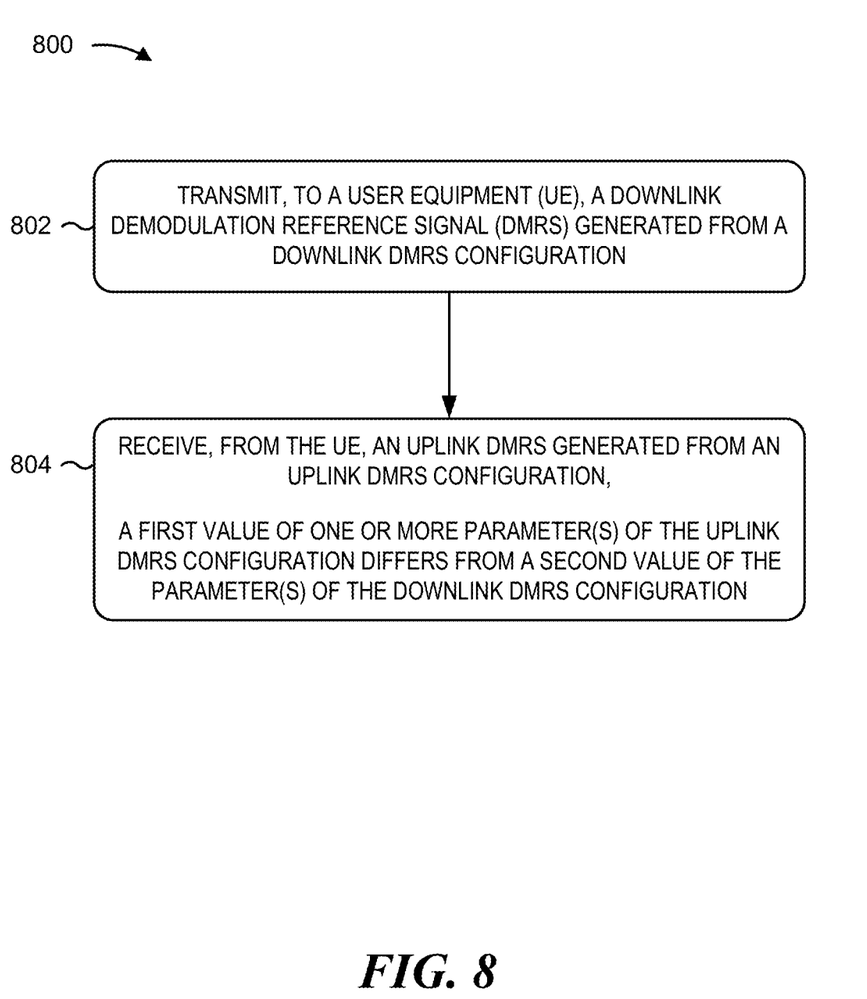
FIG. 8 is a flow diagram illustrating an example process performed, for example, by a base station, in accordance with various aspects of the present disclosure.

FIG. 8 is a flow diagram illustrating an example process 800 performed, for example, by a base station, in accordance with various aspects of the present disclosure. The example process 800 is an example of demodulation reference signals (DMRSs) with partially or fully overlapped uplink (UL) and downlink (DL) DMRS resources. The operations of the process 800 may be implemented by a base station 110.

At block 802, the base station transmits, to a user equipment (UE), a downlink demodulation reference signal (DMRS) generated from a downlink DMRS configuration. For example, the base station (e.g., using the antenna 234, MOD/DEMOD 232, TX MIMO processor 230, transmit processor 220, controller/processor 240, and/or memory 242) may transmit the DMRS. An uplink DMRS configuration may be based on the downlink DMRS configuration.

At block 804, the base station receives, from the UE, an uplink DMRS generated from an uplink DMRS configuration, a first value of one or more parameter(s) of the uplink DMRS configuration differing from a second value of the parameter(s) of the downlink DMRS configuration. For example, the base station (e.g., using the antenna 234, MOD/DEMOD 232, MIMO detector 236, receive processor 228, controller/processor 240, and/or memory 242) may receive the uplink DMRS. The receiving may occur in response to the downlink DMRS at least partially overlapping with the uplink DMRS. The one or more parameter(s) of the downlink DMRS configuration includes a downlink DMRS scrambling identifier (ID), a downlink DMRS orthogonal cover code (OCC), a downlink DMRS transmission comb level, and/or a downlink DMRS transmission comb offset

Example Aspects

Aspect 1: A method of wireless communication by a user equipment (UE), comprising: receiving, from a base station, a downlink demodulation reference signal (DMRS) generated from a downlink DMRS configuration; and transmitting, to the base station, an uplink DMRS generated from an uplink DMRS configuration, a first value of at least one parameter of the uplink DMRS configuration differing from a second value of the at least one parameter of the downlink DMRS configuration.

Aspect 2: The method of Aspect 1, in which the transmitting occurs in response to the downlink DMRS at least partially overlapping with the uplink DMRS.

Aspect 3: The method of Aspect 1 or 2, in which the at least one parameter of the downlink DMRS configuration includes at least one of a downlink DMRS scrambling identifier (ID), a downlink DMRS orthogonal cover code (OCC), a downlink DMRS transmission comb level, and a downlink DMRS transmission comb offset.

Aspect 4: The method of claim 3, further comprising: receiving, from the base station, a configuration for the downlink DMRS scrambling ID and the downlink DMRS OCC; and determining an uplink DMRS scrambling ID based on the downlink DMRS scrambling ID and/or determining an uplink DMRS OCC based on the downlink DMRS OCC.

Aspect 5: The method of any of the preceding Aspects, in which the determining of the uplink DMRS scrambling ID and/or uplink DMRS OCC is based on a type of a downlink waveform and a type of an uplink waveform.

Aspect 6: The method of any of the preceding Aspects, in which the determining of the uplink DMRS scrambling ID and/or uplink DMRS OCC is based on a generated sequence on a cyclic prefix orthogonal frequency division multiplexed (CP-OFDM) waveform and a discrete Fourier transform (DFT) of the generated sequence on a single carrier (SC)-OFDM waveform.

Aspect 7: The method of any of the preceding Aspects, further comprising determining the uplink DMRS configuration based on the downlink DMRS configuration.

Aspect 8: The method of any of the preceding Aspects, in which the uplink DMRS configuration includes an uplink transmission comb level and/or uplink transmission comb offset, shifted by a shift amount, from a downlink transmission comb level and/or downlink transmission comb offset.

Aspect 9: The method of any of the preceding Aspects, in which the shift amount is indicated by the base station.

Aspect 10: The method of any of the preceding Aspects, further comprising receiving the shift amount via radio resource control (RRC) signaling, a media access control-control element (MAC-CE), and/or a downlink control information (DCI) message.

Aspect 11: A method of wireless communication by a base station, comprising: transmitting, to a user equipment (UE), a downlink demodulation reference signal (DMRS) generated from a downlink DMRS configuration; and receiving, from the UE, an uplink DMRS generated from an uplink DMRS configuration, a first value of at least one parameter of the uplink DMRS configuration differing from a second value of the at least one parameter of the downlink DMRS configuration.

Aspect 12: The method of Aspect 11, in which the receiving occurs in response to the downlink DMRS at least partially overlapping with the uplink DMRS.

Aspect 13: The method of Aspect 11 or 12, in which the at least one parameter of the downlink DMRS configuration includes at least one of a downlink DMRS scrambling identifier (ID), a downlink DMRS orthogonal cover code (OCC), a downlink DMRS transmission comb level, and a downlink DMRS transmission comb offset.

Aspect 14: The method of any of the Aspects 11-13, further comprising transmitting, to the UE, a configuration for the downlink DMRS scrambling ID and the downlink DMRS OCC to enable determining of an uplink DMRS scrambling ID based on the downlink DMRS scrambling ID and/or determining an uplink DMRS OCC based on the downlink DMRS OCC.

Aspect 15: The method of any of the Aspects 11-14, in which the uplink DMRS scrambling ID and/or uplink DMRS OCC is based on a type of a downlink waveform and a type of an uplink waveform.

Aspect 16: The method of any of the Aspects 11-15, in which the uplink DMRS scrambling ID and/or uplink DMRS OCC is based on a generated sequence on a cyclic prefix orthogonal frequency division multiplexed (CP-OFDM) waveform and a discrete Fourier transform (DFT) of the generated sequence on a single carrier (SC)-OFDM waveform.

Aspect 17: The method of any of the Aspects 11-16, in which the uplink DMRS configuration is based on the downlink DMRS configuration.

Aspect 18: The method of any of the Aspects 11-17, in which the uplink DMRS configuration includes an uplink transmission comb level and/or uplink transmission comb offset, shifted by a shift amount, from a downlink transmission comb level and/or downlink transmission comb offset.

Aspect 19: The method of any of the Aspects 11-18, further comprising indicating, to the UE, the shift amount.

Aspect 20: The method of any of the Aspects 11-19, further comprising transmitting the shift amount via radio resource control (RRC) signaling, a media access control-control element (MAC-CE), and/or a downlink control information (DCI) message.

Aspect 21: An apparatus for wireless communication by a user equipment (UE), comprising: a memory; and at least one processor coupled to the memory, the at least one processor configured: to receive, from a base station, a downlink demodulation reference signal (DMRS) generated from a downlink DMRS configuration; and to transmit, to the base station, an uplink DMRS generated from an uplink DMRS configuration, a first value of at least one parameter of the uplink DMRS configuration differing from a second value of the at least one parameter of the downlink DMRS configuration.

Aspect 22: The apparatus of Aspect 21, in which the at least one processor is configured to transmit occurs in response to the downlink DMRS at least partially overlapping with the uplink DMRS.

Aspect 23: The apparatus of Aspect 21 or 22, in which the at least one parameter of the downlink DMRS configuration includes at least one of a downlink DMRS scrambling identifier (ID), a downlink DMRS orthogonal cover code (OCC), a downlink DMRS transmission comb level, and a downlink DMRS transmission comb offset.

Aspect 24: The apparatus of any of the Aspects 21-23, in which the at least one processor is further configured: to receive, from the base station, a configuration for the downlink DMRS scrambling ID and the downlink DMRS OCC; and to determine an uplink DMRS scrambling ID based on the downlink DMRS scrambling ID and/or determining an uplink DMRS OCC based on the downlink DMRS OCC.

Aspect 25: The apparatus of any of the Aspects 21-24, in which the at least one processor is configured to determine the uplink DMRS scrambling ID and/or uplink DMRS OCC based on a type of a downlink waveform and a type of an uplink waveform.

Aspect 26: The apparatus of any of the Aspects 21-25, in which the at least one processor is configured to determine the uplink DMRS scrambling ID and/or uplink DMRS OCC based on a generated sequence on a cyclic prefix orthogonal frequency division multiplexed (CP-OFDM) waveform and a discrete Fourier transform (DFT) of the generated sequence on a single carrier (SC)-OFDM waveform.

Aspect 27: The apparatus of any of the Aspects 21-26, in which the at least one processor is further configured to determine the uplink DMRS configuration based on the downlink DMRS configuration.

Aspect 28: The apparatus of any of the Aspects 21-27, in which the uplink DMRS configuration includes an uplink transmission comb level and/or uplink transmission comb offset, shifted by a shift amount, from a downlink transmission comb level and/or downlink transmission comb offset.

Aspect 29: The apparatus of any of the Aspects 21-28, in which the shift amount is indicated by the base station.

Aspect 30: The apparatus of any of the Aspects 21-29, in which the at least one processor is further configured to receive the shift amount via radio resource control (RRC) signaling, a media access control-control element (MAC-CE), and/or a downlink control information (DCI) message.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such.

Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   receiving, from a base station, a downlink demodulation reference signal (DMRS) configuration for a downlink DMRS scrambling ID and a downlink DMRS orthogonal cover code (OCC);
   determining an uplink DMRS scrambling ID based on the downlink DMRS scrambling ID and determining an uplink DMRS OCC based on the downlink DMRS OCC;
   receiving, from the base station, a downlink DMRS generated from the downlink DMRS configuration; and
   transmitting, to the base station, an uplink DMRS generated from an uplink DMRS configuration, a first value of at least one parameter of the uplink DMRS configuration differing from a second value of the at least one parameter of the downlink DMRS configuration, wherein the at least one parameter of the downlink DMRS configuration includes at least one of the downlink DMRS scrambling identifier (ID), the downlink DMRS orthogonal cover code (OCC), a downlink DMRS transmission comb level, and a downlink DMRS transmission comb offset.

2. The method of claim 1, in which the transmitting occurs in response to the downlink DMRS at least partially overlapping with the uplink DMRS.

3. The method of claim 1, in which the determining of the uplink DMRS scrambling ID and the uplink DMRS OCC is based on a type of a downlink waveform and a type of an uplink waveform.

4. The method of claim 1, in which the determining of the uplink DMRS scrambling ID and the uplink DMRS OCC is based on a generated sequence on a cyclic prefix orthogonal frequency division multiplexed (CP-OFDM) waveform and a discrete Fourier transform (DFT) of the generated sequence on a single carrier (SC)-OFDM waveform.

5. The method of claim 1, further comprising determining the uplink DMRS configuration based on the downlink DMRS configuration.

6. The method of claim 5, in which the uplink DMRS configuration includes an uplink transmission comb level and uplink transmission comb offset, shifted by a shift amount, from a downlink transmission comb level and downlink transmission comb offset.

7. The method of claim 6, in which the shift amount is indicated by the base station.

8. The method of claim 7, further comprising receiving the shift amount via radio resource control (RRC) signaling, a media access control-control element (MAC-CE), and a downlink control information (DCI) message.

9. A method of wireless communication by a base station, comprising:
   transmitting, to a user equipment (UE), a downlink demodulation reference signal (DMRS) configuration for a downlink DMRS scrambling ID and a downlink DMRS orthogonal cover code (OCC) to enable determining of an uplink DMRS scrambling ID based on the downlink DMRS scrambling ID or determining of an uplink DMRS OCC based on the downlink DMRS OCC;
   transmitting, to the user equipment (UE), a downlink demodulation reference signal (DMRS) generated from the downlink DMRS configuration; and
   receiving, from the UE, an uplink DMRS generated from an uplink DMRS configuration, a first value of at least one parameter of the uplink DMRS configuration differing from a second value of the at least one parameter of the downlink DMRS configuration, wherein the at least one parameter of the downlink DMRS configuration includes at least one of the downlink DMRS scrambling identifier (ID), the downlink DMRS OCC, a downlink DMRS transmission comb level, and a downlink DMRS transmission comb offset.

10. The method of claim 9, in which the receiving occurs in response to the downlink DMRS at least partially overlapping with the uplink DMRS.

11. The method of claim 9, in which the uplink DMRS scrambling ID and the uplink DMRS OCC is based on a type of a downlink waveform and a type of an uplink waveform.

12. The method of claim 9, in which the uplink DMRS scrambling ID and the uplink DMRS OCC is based on a generated sequence on a cyclic prefix orthogonal frequency division multiplexed (CP-OFDM) waveform and a discrete Fourier transform (DFT) of the generated sequence on a single carrier (SC)-OFDM waveform.

13. The method of claim 9, in which the uplink DMRS configuration is based on the downlink DMRS configuration.

14. The method of claim 13, in which the uplink DMRS configuration includes an uplink transmission comb level and uplink transmission comb offset, shifted by a shift amount, from a downlink transmission comb level and downlink transmission comb offset.

15. The method of claim 14, further comprising indicating, to the UE, the shift amount.

16. The method of claim 15, further comprising transmitting the shift amount via radio resource control (RRC) signaling, a media access control-control element (MAC-CE), and a downlink control information (DCI) message.

17. An apparatus for wireless communication by a user equipment (UE), comprising:
   a memory; and
   at least one processor coupled to the memory, the at least one processor configured:
   to receive, from a base station, a downlink demodulation reference signal (DMRS) configuration for a downlink DMRS scrambling ID and a downlink DMRS orthogonal cover code (OCC);
   to determine an uplink DMRS scrambling ID based on the downlink DMRS scrambling ID or determine an uplink DMRS OCC based on the downlink DMRSOCC has been replaced with the downlink DMRSOCC;
   to receive, from the base station, a downlink DMRS generated from the downlink DMRS configuration; and
   to transmit, to the base station, an uplink DMRS generated from an uplink DMRS configuration, a first value of at least one parameter of the uplink DMRS configuration differing from a second value of the at least one parameter of the downlink DMRS configuration, wherein the at least one parameter of the downlink DMRS configuration includes at least one of the downlink DMRS scrambling identifier (ID), the downlink DMRS orthogonal cover code (OCC), a downlink DMRS transmission comb level, and a downlink DMRS transmission comb offset.

18. The apparatus of claim 17, in which the at least one processor is configured to transmit occurs in response to the downlink DMRS at least partially overlapping with the uplink DMRS.

19. The apparatus of claim 17, in which the at least one processor is configured to determine the uplink DMRS scrambling ID and the uplink DMRS OCC based on a type of a downlink waveform and a type of an uplink waveform.

20. The apparatus of claim 17, in which the at least one processor is configured to determine the uplink DMRS scrambling ID and the uplink DMRS OCC based on a generated sequence on a cyclic prefix orthogonal frequency division multiplexed (CP-OFDM) waveform and a discrete Fourier transform (DFT) of the generated sequence on a single carrier (SC)-OFDM waveform.

21. The apparatus of claim 17, in which the at least one processor is further configured to determine the uplink DMRS configuration based on the downlink DMRS configuration.

22. The apparatus of claim 21, in which the uplink DMRS configuration includes an uplink transmission comb level and uplink transmission comb offset, shifted by a shift amount, from a downlink transmission comb level and downlink transmission comb offset.

23. The apparatus of claim 22, in which the shift amount is indicated by the base station.

24. The apparatus of claim 23, in which the at least one processor is further configured to receive the shift amount via radio resource control (RRC) signaling, a media access control-control element (MAC-CE), and a downlink control information (DCI) message.

* * * * *